April 28, 1925.
J. W. KUHN
1,536,023
CUSHION TIRE
Filed June 28, 1924   2 Sheets-Sheet 1
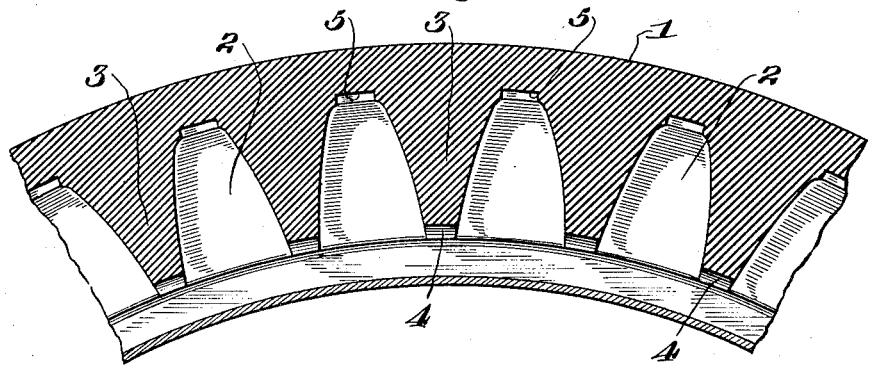
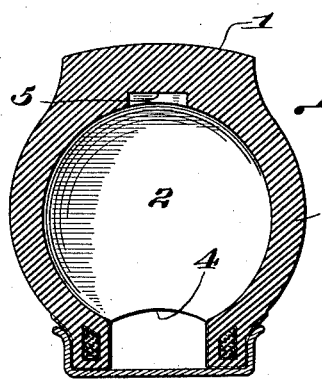 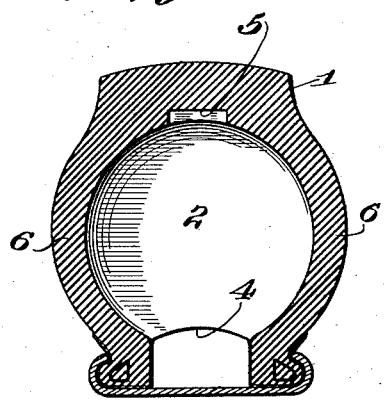
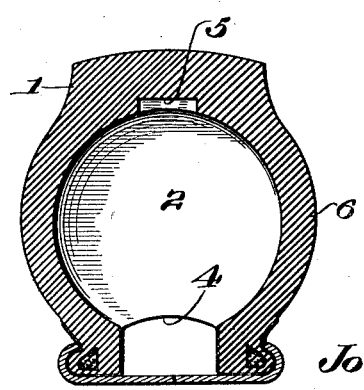
Inventor
John Wesley Kuhn.
By Eccleston & Eccleston
Attorneys April 28, 1925. 1,536,023
J. W. KUHN
CUSHION TIRE
Filed June 28, 1924 2 Sheets-Sheet 2
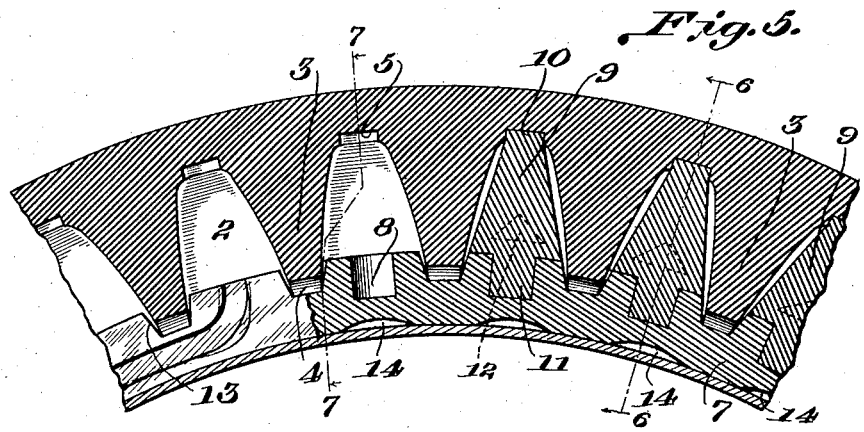
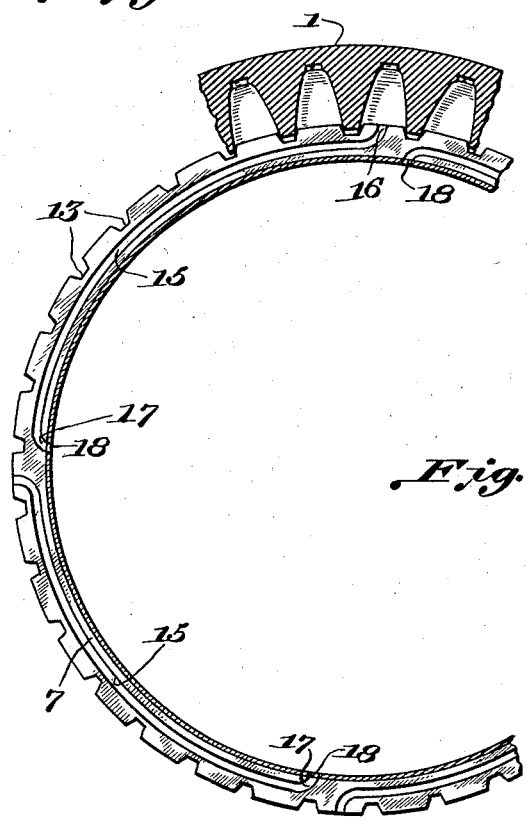
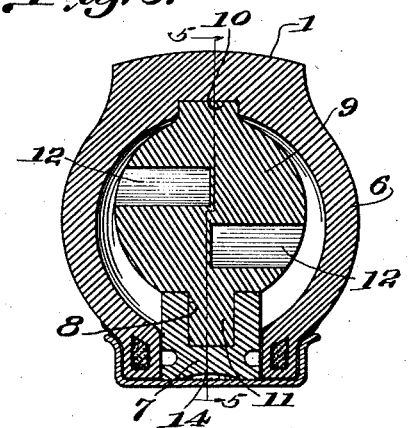
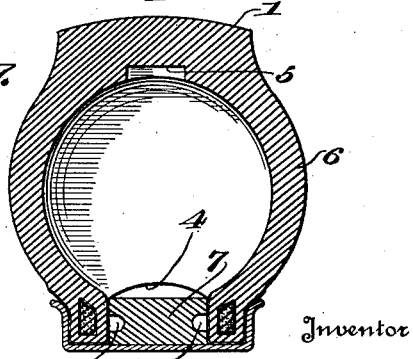
Inventor
John Wesley Kuhn.
By Eccleston & Eccleston
Attorneys Patented Apr. 28, 1925.

1,536,023

UNITED STATES PATENT OFFICE.

JOHN W. KUHN, OF CHILLICOTHE, OHIO.

CUSHION TIRE.

Application filed June 28, 1924. Serial No. 723,042.

*To all whom it may concern:*

Be it known that I, JOHN W. KUHN, a citizen of the United States, residing at Chillicothe, in the county of Ross and State of Ohio, have invented certain new and useful Improvements in Cushion Tires, of which the following is a full, clear, and exact description.

My invention relates to rubber tires and more especially to tires such as are common on automobiles; and has for one of its objects to provide a tire having a much longer life than the ordinary pneumatic tire, and one which will be free from the liabilities of blow-outs and punctures.

A further object of the invention resides in the provision of a cushion tire having the general appearance of the ordinary pneumatic tire, and which embodies a number of shock-absorbing elements sufficient to produce a riding effect equivalent to that of a pneumatic tire.

A further object of the invention resides in the provision of a tire having more traction than a pneumatic tire due to the fact that it has a greater surface in contact with the ground, thereby also tending to prevent skidding and the like.

Other objects and advantages of the invention will be apparent from the following description when taken in connection with the accompanying drawings, in which, Figure 1 is a fragmentary section through a tire and rim.

Figures 2, 3 and 4 are transverse sections through tires embodying my invention and provided with different types of beads.

Figure 5 is a section taken on line 5—5 of Figure 6 and showing a modified form.

Figure 6 is a section taken on line 6—6 of Figure 5.

Figure 7 is a section taken on line 7—7 of Figure 5, and

Figure 8 is a detail view.

Referring to the drawings more in detail the numeral 1 indicates generally my improved cushion tire which is formed with a plurality of pockets 2 as shown in Figure 1. These pockets are separated by the tapered partitions 3 and while cone-shaped in one direction as disclosed in Figure 1, they are circular in a direction at right angles thereto as clearly shown in Figures 2, 3 and 4. The number and size of the pockets 2 may vary according to the amount of resiliency desired, and the tires themselves may be formed in any of the usual forms such as the straight side shown in Figure 2 or the clincher types shown in Figures 3 and 4 the types shown in Figures 2 and 4 being provided with wire beads and the type shown in Figure 3 being provided with a rubber bead, although rubber beads may be substituted for the wire beads if desired.

The partitions 3 which separate the pockets 2 have their inner edges arched as indicated by the numeral 4 and the bases of the cone-shaped pockets 2 are provided with circular recesses 5 for a purpose to be hereinafter described. The side walls 6 of the tire are comparatively thick of course in order to approximate the required resiliency of the tire and to increase the wearing qualities thereof.

The tire just described and shown in Figures 1 to 4 inclusive is complete in itself and may be applied to any usual type of rim as shown in these figures. Where greater shock-absorbing qualities are required however I have devised additional elements as shown in Figures 5 to 8 inclusive. The additional or supplemental elements are adapted to be positioned within the tire previously described and between the latter and the rim on which it is placed. The base or body of the supplemental shock-absorbing elements consists of an annular member 7 of rubber which is adapted to seat between the inner walls of the two beads of the tire. This member is provided with cylindrical recesses 8 in its outer periphery which are directly opposed to the recesses 5 in the pockets 2 of the tire.

Located in each of the pockets 2 is a rubber shock-absorber or filler 9 which is tapered in one direction as shown in Figure 5 and circular in another direction as shown in Figure 6. This element is provided with integral pins 10 and 11 at its outer and inner ends respectively which are adapted to seat in the circular recesses 5 and 8 previously described. Each of these fillers 9 is provided with oppositely disposed but staggered recesses 12 which lend added resiliency to these elements.

The annular member 7 is provided with transverse notches 13 as more clearly shown in Figure 8 and these notches are adapted to receive the inner arched ends 4 of the partitions 3, but do not normally engage the latter thereby increasing the resiliency of the tire and permitting circulation of air. As a means for giving added resiliency to the tire the annular member 7 is provided with the dished recesses 14 located directly beneath the fillers 9 and adapted to permit a slight circumferential movement thereof.

A tire as described will of course be somewhat compressed at that point in contact with the ground and consequently there will be a continual shifting of air around the tire which might be termed a breathing of the tire. In order to equalize this breathing effect in the operation of the tire I have provided the side walls of the annular member 7 with the grooves 15 each of which preferably extends through about a quarter of the circumference of the tire. One end of groove 15 is turned up as indicated by numeral 16 so as to open into a pocket 2 while its opposite end is turned downwardly as indicated by numeral 17 so as to communicate with aperture 18 in the rim. This construction will permit an intake and exhaust of atmospheric air as may become necessary due to the compression and expansion of the various parts of the tire.

In the operation of the tire it will be apparent that there are many elements which perform the function of shock-absorbers, namely, the partitions 3, the arches 4 which will be compressed as the partitions are forced into the grooves 13, the fillers 9 and recesses 12, the side walls of the tires, the rubber itself, and lastly the dished recesses 14 under the fillers 9 which permit a longitudinal movement thereof.

While I have described and shown the tire as of the single type such as are generally used on pleasure vehicles it will be obvious that the same novel features may be embodied in double tires for trucks and the like and such double tires may be integrally connected or may be made separately and then be mechanically united.

From the foregoing description taken in connection with the accompanying drawings it will be apparent that I have devised a cushion tire having the general appearance and shape of the ordinary pneumatic tire, and one in which the stresses and strains are distributed through a number of shock-absorbing elements so as to give the advantages of the well-known pneumatic tire without the disadvantages of blow-outs, punctures, etc.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A cushion tire including a body portion formed with a plurality of inwardly opening pockets having recesses in the bases thereof, an annular member positioned between the beads of the tire and provided with recesses opposed to the first-mentioned recesses, and a plurality of shock-absorbing elements positioned in the pockets and having their ends seated in the opposed recesses.

2. A cushion tire including a body portion formed with a plurality of inwardly opening pockets, inwardly extending partitions, separating said pockets, and formed with concaved ends, an annular member positioned between the beads of the tire and provided with transverse notches in which are received the concaved ends of the partitions.

3. A cushion tire including a body portion formed with a plurality of inwardly opening pockets, inwardly extending partitions separating said pockets, an annular member positioned between the beads of the tire and provided with transverse notches in which are received the ends of the partitions, said annular member being provided with grooves communicating with the interior of certain of the pockets and with the atmosphere.

4. A cushion tire including a body portion formed with a plurality of inwardly opening pockets, an annular member positioned between the beads of the tire and provided with dished recesses on its inner periphery in alignment with said pockets, and a plurality of shock-absorbing elements carried by said annular member and positioned in said pockets.

JOHN W. KUHN.